July 25, 1961 W. T. RENTSCHLER 2,993,425
PHOTOGRAPHIC CAMERA
Filed Dec. 19, 1957 6 Sheets-Sheet 1
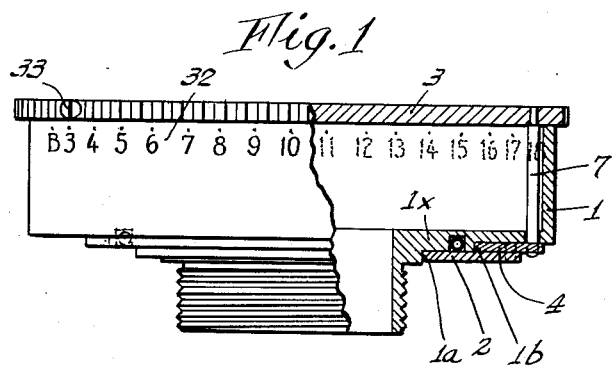
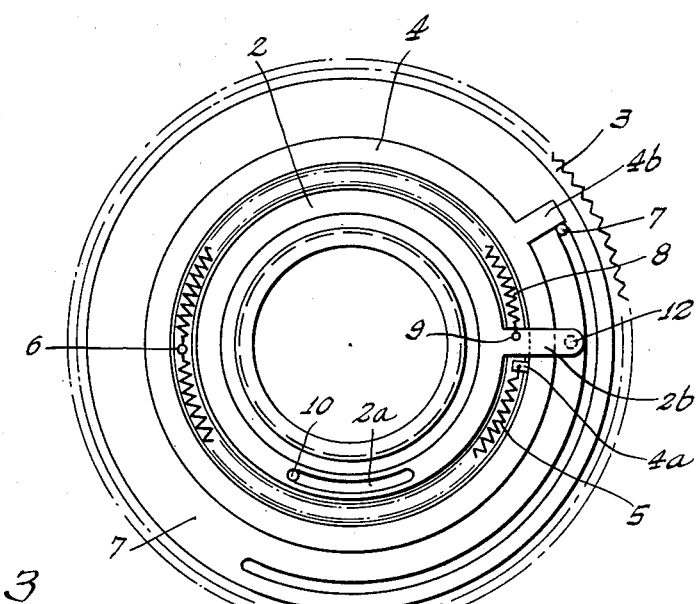
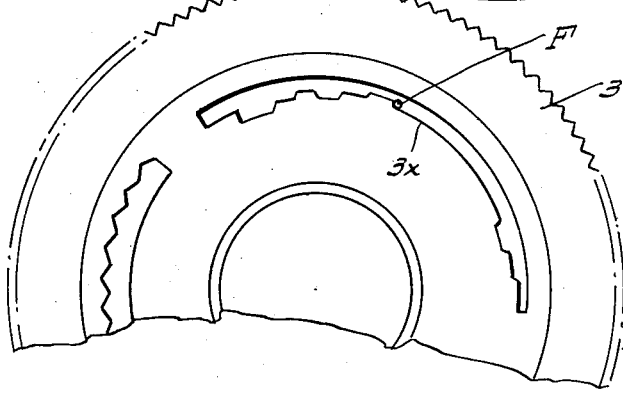
INVENTOR.
Waldemar T. Rentschler
BY
Munn, Liddy, Daniels & March
ATTORNEYS

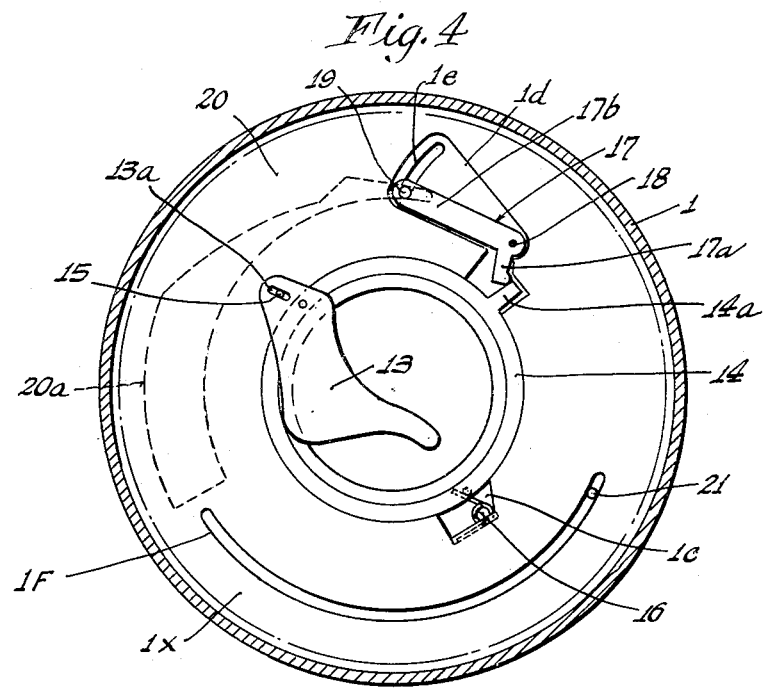
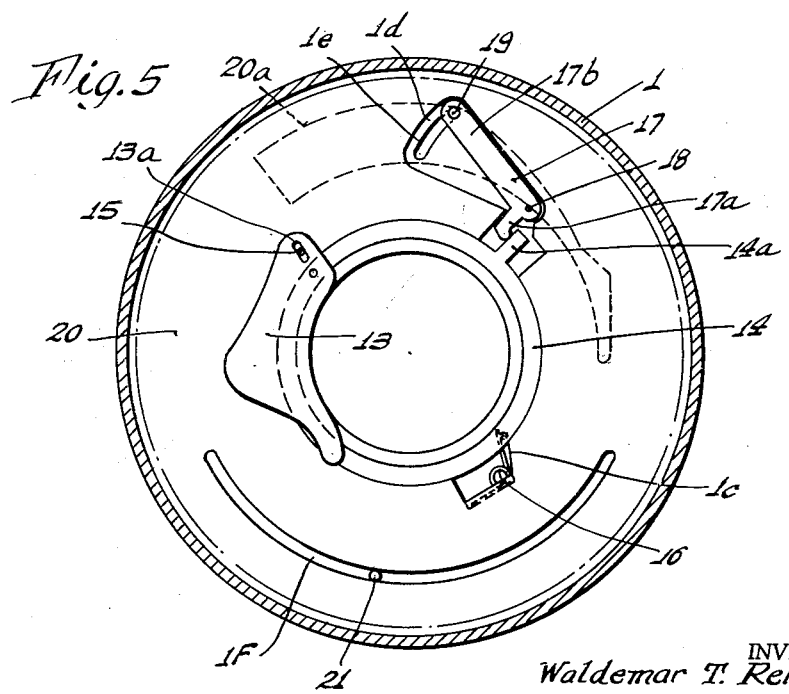

July 25, 1961 W. T. RENTSCHLER 2,993,425
PHOTOGRAPHIC CAMERA
Filed Dec. 19, 1957 6 Sheets-Sheet 3

INVENTOR.
Waldemar T. Rentschler
BY
Munn, Liddy, Daniels & March
ATTORNEYS

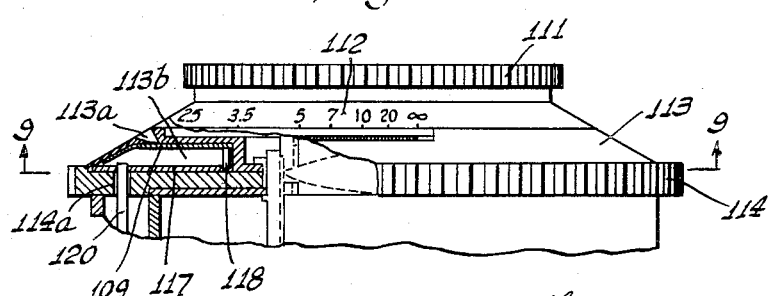
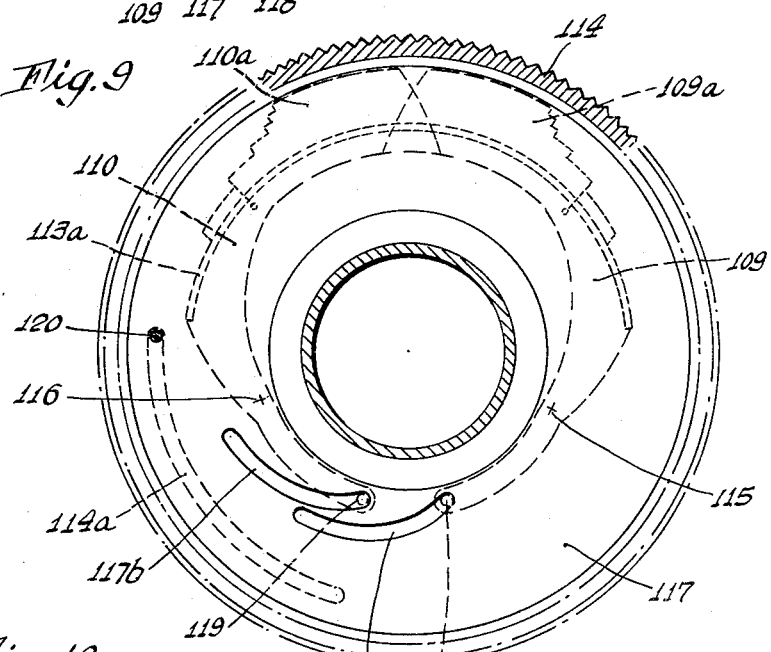
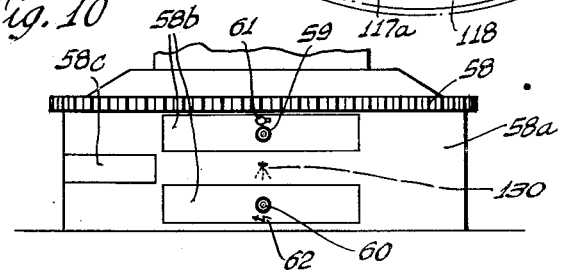
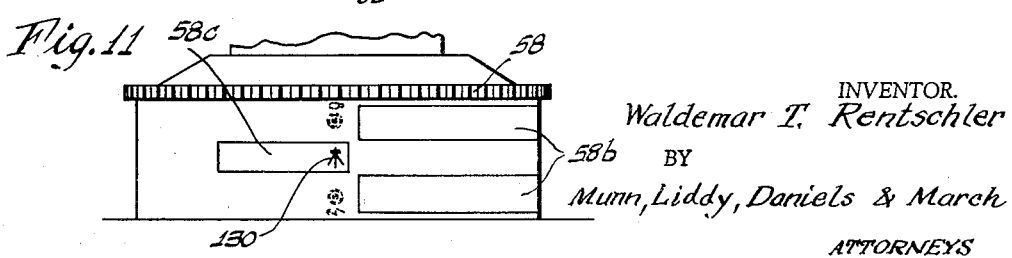

July 25, 1961 W. T. RENTSCHLER 2,993,425
PHOTOGRAPHIC CAMERA
Filed Dec. 19, 1957 6 Sheets-Sheet 5
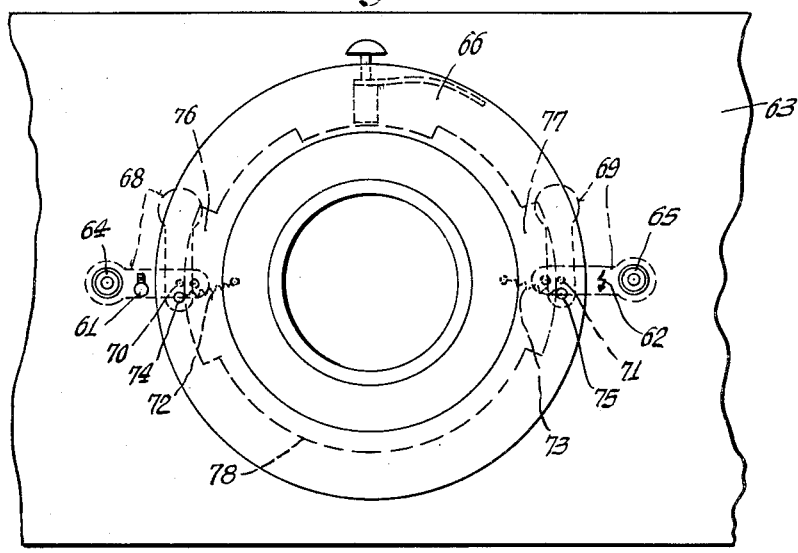
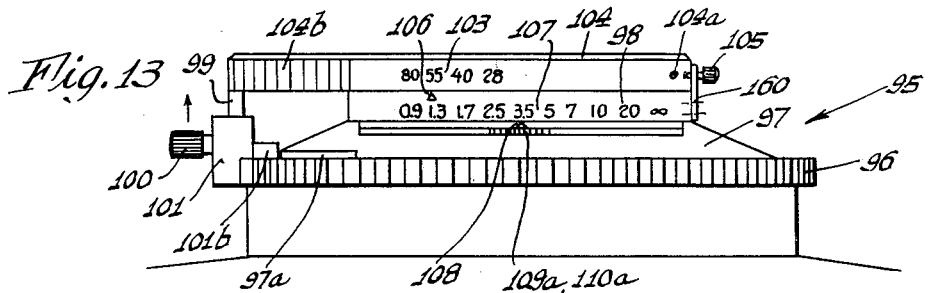
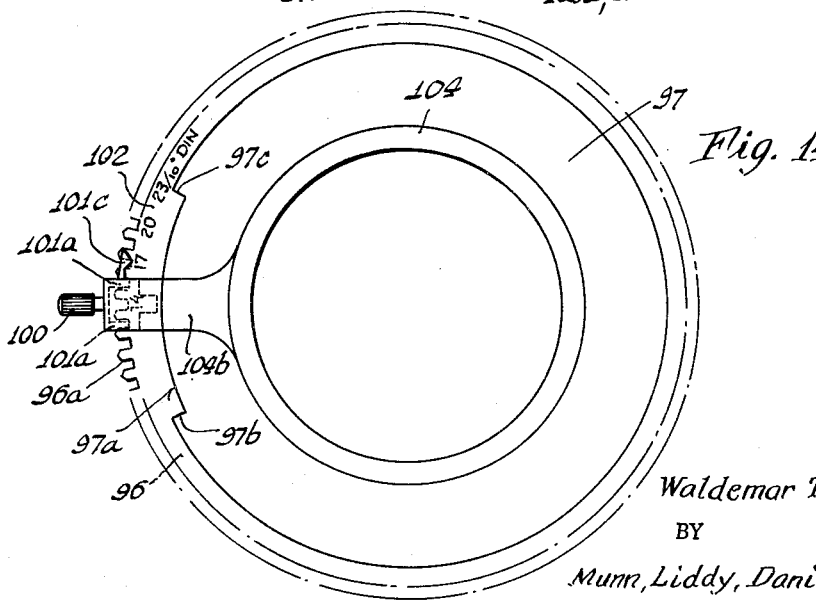
INVENTOR.
Waldemar T. Rentschler
BY
Munn, Liddy, Daniels & March
ATTORNEYS July 25, 1961 W. T. RENTSCHLER 2,993,425
PHOTOGRAPHIC CAMERA
Filed Dec. 19, 1957 6 Sheets-Sheet 6

INVENTOR.
Waldemar T. Rentschler
BY
Munn, Liddy, Daniels & March
ATTORNEYS

United States Patent Office

2,993,425
Patented July 25, 1961

2,993,425
PHOTOGRAPHIC CAMERA
Waldemar T. Rentschler, Calmbach (Enz), Germany, assignor to Alfred Gauthier G.m.b.H., Calmbach (Enz), Germany, a corporation of Germany
Filed Dec. 19, 1957, Ser. No. 703,903
Claims priority, application Germany Dec. 21, 1956
14 Claims. (Cl. 95—64)

This invention relates to photographic cameras of the type having variable diaphragm and shutter speed mechanisms which may be set in a number of different positions, and more particularly to cameras of this type wherein a coupling of the diaphragm and shutter speed mechanisms is effected to obtain semi-automatic exposure settings, thereby to facilitate the picture-taking operation.

In cameras of the above general type which are manually adjustable or non-automatic, individual or separate diaphragm and speed setting members usually exist or are provided. Where the operator attempts to combine speed and diaphragm values, or to select certain desirable or admissible combinations therof, difficulty is experienced, especially for beginners or persons not fully familiar with picture-taking techniques. Confusion especially exists when there is required a proper setting of the diaphragm, since the markings or diaphragm values normally provided have little significance as regards the conditions to which they are applicable.

In the past various cameras have been proposed and produced, aimed at eliminating the above drawbacks, these cameras effecting an actuation of both the diaphragm and speed-setting members through the medium of a single setting or actuation member. In one such prior camera the single actuation member serves at one and the same time as a speed control member and a diaphragm control member. This organization imposes an undesirable requirement in that, when the speed and diaphragm control operates directly from a single setting member of necessity the shutter structure becomes more complicated and requires more space. Accordingly, this results in a distinct disadvantage for cameras and shutter structures of the ordinary or common kind. Additionally, certain of the exposure settings are difficult to understand because the setting of speeds which does not involve an automatic running down is done by means of a special setting member, and in consequence where such speeds are involved the proper determination of the exposure may not be accomplished in the simplest possible manner.

Another prior camera structure has provision for simultaneously setting the diaphragm and shutter speed by means of a single actuation member, but in such construction only two different speeds may be utilized, one being rendered effective at an end position of the actuation member. Accordingly, it is possible to utilize only a relatively small exposure value range, and this considerably limits the field of application of the camera.

The above disadvantages and drawbacks of prior cameras having semi-automatic setting devices are obviated by the present invention, and one object of the invention is to provide an improved photographic camera of the above type wherein the basic camera structure may be retained, especially the shutter and diaphragm mechanisms, while at the same time there is made possible a simple and fool-proof exposure setting which enables good pictures to be taken in every instance, and wherein the combining of the speed and diaphragm values does not restrict the field of application with respect to various conditions of illumination any more than occurs in well-known cameras where the diaphragm and speed setting members are individually actuated.

In accomplishing this, in accordance with the invention, the speed and diaphragm setting members are so coordinated with a single main actuation member which reads on an exposure value scale that, for a part of the range of movement of the single actuation member corresponding to a moderate shutter speed sufficiently fast for taking pictures with the camera hand-held, the entire range of values of the diaphragm are obtainable, and that for another range of movement of the single or main actuation member, wherein slower shutter speeds are involved, a large diaphragm opening is utilized. The organization is so constituted that a uniform or monotonous exposure value graduation is possible for the single actuation member. For the said fixed, moderate speed setting a uniform or monotonous displacement is effected by changing diaphragm openings, and for the various different slower shutter speeds the monotonous displacement of the single or main actuation member is effected by the different shutter speeds while the diaphragm opening remains large, for example, at its maximum value. The main actuation member, when moved to still another portion of its range, may co-ordinate the highest shutter speed with several consecutive, small diaphragm openings, to continue the said monotonous displacement.

With such construction, the camera of the present invention has an advantage in that the setting and control mechanisms for the speed and diaphragm may be formed or built-up in the usual well-known manner, and that using the single actuation member in coordination with the separate setting members a simple coupling or control structure may be utilized while still making possible for taking of excellent pictures at all times.

In adjusting the camera for a certain exposure setting, the operator need only turn or set the single actuation member to a position corersponding to the prevailing light conditions. This may be effected, for example, by providing in conjunction with such actuation member a simple scale of marks or symbols.

In carrying out the invention further, and to increase the simplicity of operation of the camera, the single actuation member may be coupled with an exposure meter in such a manner that to obtain the correct setting of the member only a pointer and a mark must be brought in coordination with each other.

In accordance with the invention, the coordination of a particular shutter speed with the entire range of adjustment of the diaphragm is advantageous not only for daylight exposures, but also for exposures using various types of flash lamps. For, by providing for such shutter speed a relatively short or rapid interval, as for example ⅙₀ of a second, which is suitable for taking pictures when the camera is held in the hand, various types of flash exposures may be made, both with ordinary flash lamps as well as electronic flash equipment, and the camera adjustment will be satisfactory for obtaining clear and perfectly executed pictures while at the same time there is required of the operator only a very simple adjustment or setting of the camera.

The invention provides an effective and economical structure by which the single actuation member is coupled to the diaphragm mechanism, such structure employing a spring or bias device which normally continuously tends to move the diaphragm mechanism in one direction toward its end position, together with a transmission device adapted to be engaged or driven by the single actuation member. Moreover, the organization is such that various types of transmission devices are possible, as will be understood from a consideration of the illustrated embodiments of the invention and description relating thereto.

In one illustrated embodiment an especially simple connection exists between the single actuation or setting member and the speed setting member of the camera, in that both said members are constituted of one and the same part.

In other embodiment of the invention a coupling between the single or main actuation member and the speed setting member is made releasable, this being advantageous where the speed setting member has relatively short movement. In such organization a releasable coupling is made to be effective through only that portion of the range of movement of the single actuation member where a monotonous or uniform exposure graduation is employed utilizing changes in the speed of the shutter.

Moreover, in other embodiments of the invention employing a simple setting of the single actuation member the factor of film sensitivity, and also other factors, are taken into consideration in addition to the light conditions, by effecting a coupling between the single actuation member and an exposure meter provided on the camera structure. With this organization the pointer or indicator of the exposure meter may be brought into coincidence with a setting mark in a well known manner employing mechanical, optical or electrical means, or combinations of these.

Thus the operator is not required to consider these various factors of film sensitivity and the like when he is setting the single actuation member. Instead, with the present improved camera structure no decision or computation at all is required of the operator as to the various settings. It is only necessary for the operator to establish the coincidence mentioned between the setting mark and the exposure meter pointer, by a simple setting of the single actuation member.

By this organization, which is effective for all setting positions of the single actuation member, it is only necessary for the operator to observe, after effecting such coincidence of the exposure meter indicator and the setting mark, whether the actuation member is placed on a range designated "exposures made by hand", or else a range designated "tripod exposures."

To enable these two ranges to be easily recognized, the tripod exposure range may be characterized by a special color or symbol.

Moreover, the invention further makes possible the obtaining of correct diaphragm apertures for both daylight and flash exposures without the necessity of a diaphragm scale and without requiring any knowledge of the function of the diaphragm apertures as coordinated with the various settings of the single or main actuation member, by providing a distance scale having symbols or marks thereon representative of different types of flash lamps. These scales may be movably arranged with respect to each other, and optionally one of the scales may be fixedly mounted with respect to the single or main actuation member and the other scale arranged at a setting member connected with the actuation member. Or, both such scales may be disposed at such setting member, or both may be fixedly mounted with respect to the single actuation member, in which case when it is desired to set the actuation member for the type of flash lamp and also for the required distance, the scale disposed at the setting member cooperates with the other, fixed scale during the setting movement of the actuation member or else a mark optionally arranged at the setting member or else fixedly mounted may cooperate with one of the distance- and lamp type scales which is fixed or is provided at the setting member respectively. Of the scales or the scale and mark respectively cooperating with each other, one is arranged on a carrier which is shiftable with respect to a second and basic carrier, to effect relative adjustment of the carriers. One carrier is then provided with the film sensitivity scale and the other carrier with a setting mark for such scale.

By the above arrangement it is then possible to have the instructions pertaining to setting of the single actuation member, for both day light and flash exposures, directed only to the effecting of coincidence of two relatively movable or adjustable marks or indicia. Furthermore, no special requirements of space are made by the provision of the adusting characteristics involving the distance setting device and film sensitivity device as provided by the invention.

A further simplification may be effected, as regards flash exposures, where the setting markings of the distance setting member and the single or main actuation member are stepped with a factor of 2 and are equispaced.

For obtaining automatic adjustment of the diaphragm for flash exposures, and taking into consideration the distance of the subject, a releasable coupling may be employed between the single or main actuation member and the distance setting member, and by means of such coupling the actuation member and the distance setting member may be jointly displaced in a manner such that an increase of distance is coordinated with an increase in the size of the diaphragm aperture.

In order to set the diaphragm opening to the best possible value for the various distances, thus to obtain the best possible flash exposures, the distance-setting member of the camera may be advantageously coupled with a range finder mounted on the camera structure. Thus, the operator need only adjust the range finder to the subject which is to be taken, and then by means of the coupling between the distance setting member and the single actuation member the proper diaphragm opening corresponding to distance and type of flash lamp will be automatically obtained, without requiring computation or calculation of any sort on the part of the operator.

For the purposes of preventing unsuited settings of the single or main actuation member where it exceeds the monotonous or uniform diaphragm shifting range, there is provided a limitation or stop device for limiting the joint shifting movement of the distance setting member and the single actuation member. Such movement is limited to the range which is suitable for flash exposures, and the limitation device may be made effective in response to the coupling of the distance setting member with the main, single actuation member. Thus, the limitation or stop device effectively prevents concurrent movement of the two coupled members beyond the proper partial range suitable for flash exposures.

With a camera structure as above set forth the operator need not consider at all the diaphragm setting or the diaphragm actuation, regardless of the kind of picture being taken, since the setting of the single actuation member now automatically adjusts the diaphragm to the proper opening for good pictures.

To provide further important information to the operator as to the sharpness of the image for any distance or diaphragm setting, there is provided by the invention a novel, automatically adjusted field depth indicator controlled by the diaphragm and by the distance setting means of the camera.

An effective and economical organization for effecting such indication of the depth of field is disclosed, comprising two levers having a scissor shape and adapted to cooperate with a distance setting scale, said levers being movable or displaceable in response to the shifting movement of the diahpragm mechanism.

Further features and advantages of the invention, and further embodiments thereof are revealed in the following specification, taken in connection with the figures, in which:

FIGURE 1 is a view partly in side elevation and partly in axial section, of a photographic lens shutter structure employing a transmission device as provided by the invention and connected between the single or main actuation member and the diaphragm mechanism.

FIG. 2 is a rear elevational view of the shutter structure of FIG. 1.

FIG. 3 is a fragmentary top or front view of a portion of the speed-setting member of the shutter of FIGS. 1 and 2.

FIG. 4 is a transverse sectional view through the shutter and lens housing, showing in elevation an iris diaphragm plate and a coupling means between the diaphragm and single, main actuation member, such coupling means being different from that shown in FIGS. 1 and 2. The diaphragm is adjusted to the smallest aperture.

FIG. 5 is a view like FIG. 4, with the diaphragm adjusted to fully open position.

Figure 7:
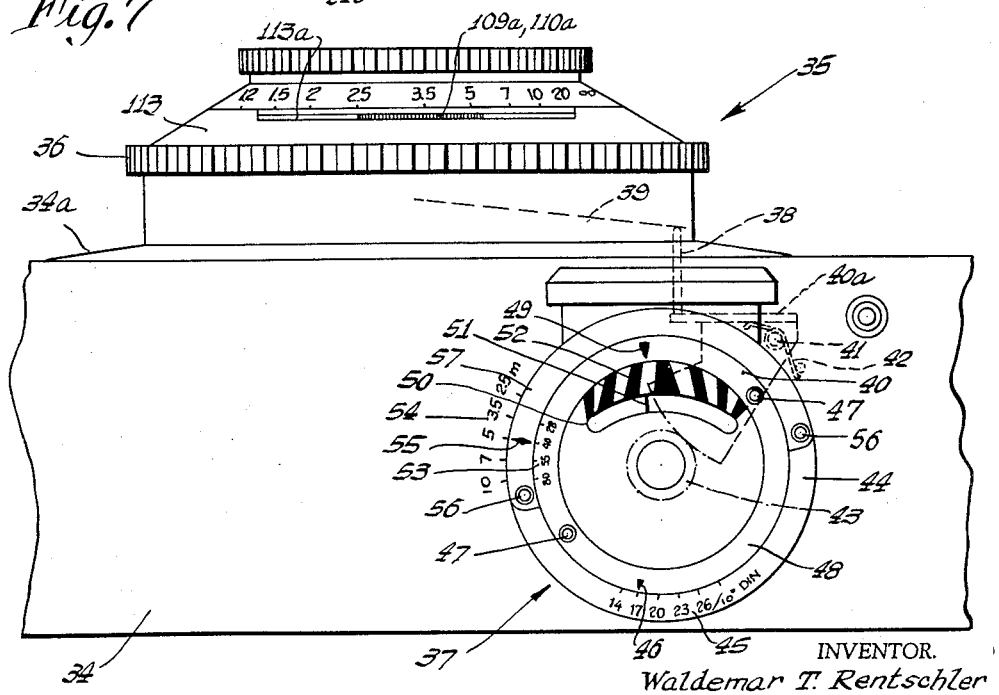

FIG. 7 is a fragmentary top view of a portion of a photographic camera having an exposure meter, the tracing member thereof being coupled with the single actuation member by a mechanical transmission, said single actuation member being arranged in accordance with the invention for effecting semi-automatic diaphragm settings for flash exposures. Also, the camera structure is provided with a device for indicating automatically the depth of field for various diaphragm openings and distances from the subject.

FIG. 8 is a fragmentary view partly in side elevation and partly in section, of a photographic lens-shutter structure having incorporated therein the automatic field depth indicator for diaphragm and distance settings, as provided by the invention.

FIG. 9 is a transverse sectional view through the front portion of the shutter structure of FIG. 8, taken on line 9—9 thereof.

FIG. 10 is a side elevational view of a shutter structure and housing, wherein the single actuation member employs a windowed cover device for revealing flash bulb connections or concealing the same, as well as symbols associated therewith. The cover is shown in its uncovering position.

FIG. 11 is a view like FIG. 10, but showing the cover as enclosing the flash bulb connections, with a symbol being revealed, indicating tripod pictures.

FIG. 12 is a front elevational view of a lens-shutter structure having flash bulb connections which are uncovered or covered in a different manner, by actuation of the single actuation member.

FIG. 13 is a side elevational view of a photographic lens-shutter structure having a single actuation member and a distance setting member, with associated scales and with a releasable coupling device arranged between said members.

FIG. 14 is a front elevational view of the structure shown in FIG. 13.

Figure 15:
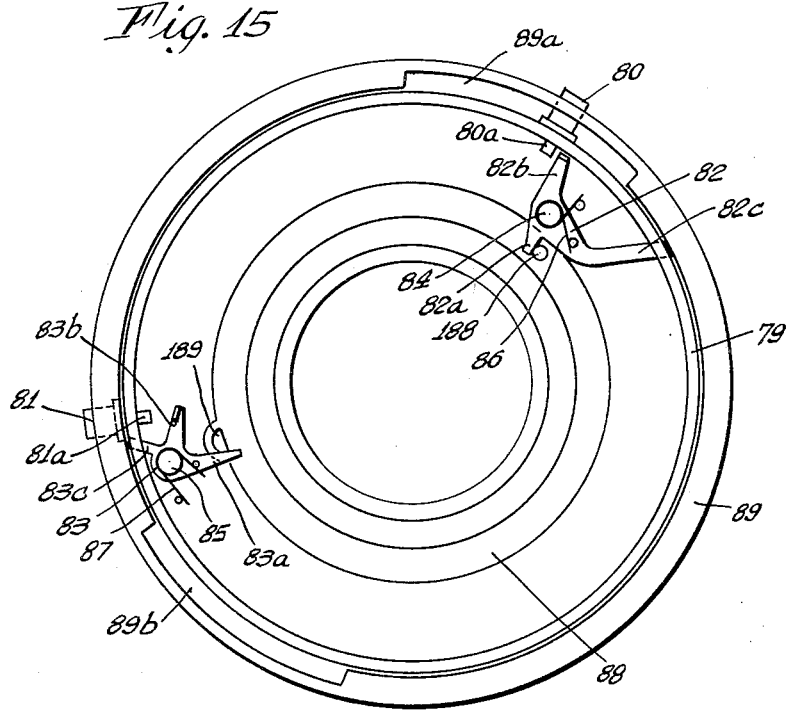

FIG. 15 is a front elevational view of interior portions of a lens-shutter and housing structure having flash contact devices incorporated therein, adapted to be controlled in response to movements of a single actuation member.

Figure 16:
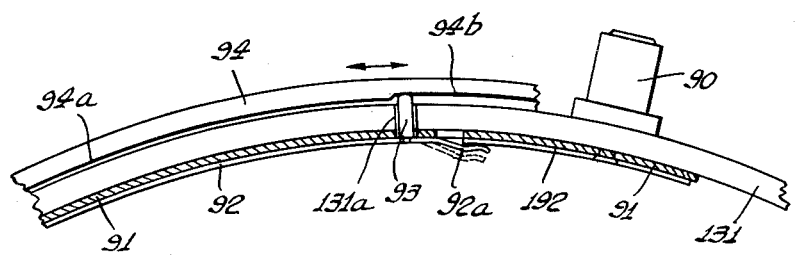

FIG. 16 is a fragmentary view, enlarged, of a portion of a flash synchronization device, there being illustrated a disconnection switch adapted to be actuated by the single actuation member.

Referring now to FIGS. 1 and 2, there is shown a usual type of photographic lens and shutter housing 1 having a generally cylindrical shape and being provided at its rear with an annular shoulder 1a rotatably carrying a diaphragm setting member or ring 2. At its front the housing 1 rotatably mounts a speed-setting ring 3 cooperating with a well-known control mechanism arranged in the interior of the housing 1, by which different shutter speeds are obtained in response to turning, adjusting movement of the ring 3.

In accordance with the present invention the diaphragm setting ring 2 and the speed setting ring 3 are coordinated and controlled by a single or main adjustable actuation member to provide a unique and desirable relationship between the shutter speeds and diaphragm openings by which various conditions may be taken into consideration, to obtain excellent pictures while requiring of the operator but a single simple adjustment. For example, a relatively short shutter speed is chosen which is effective in obtaining good pictures when the camera is held in the hand. Such speed, for example, might be advantageously 1/60 of a second, effected with the ring 3 in the FIG. 3 position or turned counterclockwise therefrom throughout the range where the pin F remains in engagement with the concentric portion of the cam edge which is indicated 3x. While retaining this same chosen shutter speed, the entire range of values of the diaphragm may be covered by adjustment of the single actuation member, in accordance with a graduated exposure value scale, for positions where the pin F rides on the edge portion 3x. The range of adjustment for these conditions may, for example, start at a diaphragm aperture of 22, and end at a diaphragm aperture of 2.8 which is the largest diaphragm opening effected by the ring 2 in the position of FIG. 2. The adjustment of the single or main actuation member could then follow in logical sequence, and might cover exposure values ranging from 15 down to 9, changing only the diaphragm to accommodate different exposure conditions. As such exposure conditions change and necessitate adjustment downward beyond the number 9 exposure value, the invention provides for maintaining the maximum diaphragm opening of 2.8 while changing now the shutter speeds to consecutively slower speeds, using the six-stepped cam edge to the left of the portion 3x as viewed in FIG. 3. Thus, the exposure value scale may be traversed by the single actuation member from the value 9 down to the value 3, to continue the simple adjustment effected in accordance with exposure values, by having the camera shutter speed change from 1/60 of a second through six steps to one second, all with the maximum diaphragm opening of 2.8. Thus, shutter speeds of 1/30 of a second, 1/15 of a second, 1/8 of a second, 1/4 of a second, 1/2 of a second and 1 second would be obtained for the exposure values of 8 to 3. Thus, the exposure value scale is continued in monotonous or uniform manner, through simple adjustment of the single actuation member, this now being effected by a slowing down of the shutter speed while maintaining the maximum diaphragm opening. The simple continuous turning movement of such single actuation member would thus effect first stepped diaphragm openings with a single shutter speed suitable for pictures with the camera hand-held, and then different shutter speeds in the slower range, suitable for tripod pictures, utilizing the largest diaphragm opening.

In the illustrated embodiments of the invention an advantageous drive is provided between the single or main actuation member and the diaphragm mechanism, such drive including a spring continuously acting on the diaphragm mechanism to move it toward one end position, and including a transmission device which is driven by the single actuation member.

In the embodiment of the invention shown in FIGS. 1 and 2 the speed setting ring 3 may itself constitute the single or main actuation member, thus obviating the necessity for additional parts, and this feature of the invention will be mentioned later, in an appropriate place. In FIGS. 1 and 2 the transmission device comprises a turnable ring 4, which rests against a bearing shoulder 1b provided on the rear wall 1x of the housing 1. The ring 4 is biased by a helical extension spring 5 which connects to a lug 4a of the ring and to a fixed pin 6 rigid with the housing 1. The spring 5 tends to turn the ring 4 clockwise as viewed in FIG. 2. A radial arm 4b extends outwardly from the ring 4 and engages a pin 7 rigidly secured to the speed setting ring 3, and such arm and pin are normally in engagement under the action of the spring 5.

A second helical extension spring 8 is provided, said spring tending to move the diaphragm mechanism toward one end position wherein the diaphragm aperture is greatest, as shown in FIG. 2. The spring 8 is disposed between the transmission ring 4 and the diaphragm setting ring 2, and is connected with the fixed pin 6 and with a pin 9 carried by the diaphragm setting ring 2. The spring 8 tends to maintain engagement between a fixed pin 10 and one end of a slot 2a provided in the ring 2 and through which the pin 10 extends. The slot 2a and pin 10 provide limits for the movement of the diaphragm mechanism. A radial arm 2b is provided on the diaphragm ring 2, having a pin 12 which is disposed in the path of movement of the arm 4b of the transmission ring 4. The spring 5 is made stronger than the spring 8, whereby its action will cause the arm 4b to drive ahead of it the pin 12, stretching the spring 8. Thus, adjustment of the diaphragm is effected in response to movement of the pin 7 downward as seen in FIGS. 2 ahead of the arm 4b which follows it under the action of the spring 5, the arm 4b picking up and moving ahead of it the pin 12 affixed to the diaphragm adjusting ring 2, as will be readily understood. During the initial travel of the ring 3, pin 7 and lug 4b, until the latter engages the pin 12, the diaphragm aperture remains fixed at its maximum as in FIG. 2, whereas the shutter speed changes. The speed setting ring 3 is thus connected to the diaphragm mechanism through a biased drive device having the spring 5.

The said coupling or transmission between the speed setting ring 3 and the diaphragm mechanism is thus seen to involve only simple components while at the same time providing an effective and reliable coupling. The transmission device as shown is seen to be particularly suited for cam-controlled diaphragms wherein relatively large movement of the diaphragm ring occurs in effecting opening and closing of the individual blades.

The speed setting ring 3 may be readily utilized also to obtain different adjustments of an iris type diaphragm having the usual shutter blades, with a simple transmission mechanism. One organization by which this is effected is shown in FIGS. 4 and 5. In these figures another type of transmission device is disclosed, which is also simple and economical to produce, by virtue of the use of a control cam connected with the speed setting ring 3 and operating a two armed lever.

As seen in FIGS. 4 and 5 in the shutter housing 1 there may be provided diaphragm blades 13 only one of which is shown for the sake of clarity. Each of the diaphragm blades 13 is pin connected to the diaphragm ring 14, and each has a slot 13a through which a fixed pin 15 extends. A spring 16 provided in a cutout 1c in the interior of the rear wall 1x of the housing normally urges the diaphragm ring 14 counterclockwise, thereby maintaining engagement between an arm 14a of the diaphragm ring and one arm 17a of the two-armed lever 17. A fixed spindle 18 is provided for the lever 17 in a cutout portion 1d in the rear wall 1x of the shutter housing. The other arm 17b of the lever 17 has a pin 19 which projects through a slot 1e in the rear housing wall 1x and constitutes a cam follower engageable with a control cam 20a connected with the single actuation member. The cam 20a may be provided as a disc 20 arranged at the rear of the shutter housing 1, and such disc may be connected by means of a pin 21 projecting through a slot 1f in the housing rear wall 1x to the single or main actuation member which latter may, for example, be the speed setting ring 3.

With such organization there is also effected a biased driving connection between the single actuation member and the diaphragm ring 14. Such biased or spring-urged drive is also termed a drive "by power." With this organization the control cam 20a may be easily produced in an economical manner, and a reliable transmission is thus provided for effecting diaphragm adjustment.

As an alternative transmission, the connection between the lever 17 and the diaphragm ring 14 may be constituted in the form of a pin and slot device, whereby reliance is not had on a charged spring to maintain engagement between the drive elements. Such positive type of drive may be termed, for example, a drive "by shape."

It will be seen from the above that different transmissions may be utilized between the single or main actuation member and the diaphragm setting member. The same is true for transmissions between the single actuation member and the speed setting member.

Referring again to the embodiment of the invention shown in FIGS. 1 and 2 an especially simple and economical to fabricate connection is established between the single or main actuation member and the speed setting member, in that both said members may be constituted by one and the same part. Thus, the single actuation member 3 would be connected with the diaphragm mechanism by means of the pin 7, already described, and such pin may be riveted or screwed to the ring 3 and may extend through the space within the shutter housing 1 closely adjacent a side wall thereof. With such organization the effecting of shutter speed changes and diaphragm opening changes in the manner of the invention may be carried out in a very simple way, through the use of a single actuation member constituted as the speed setting ring 3. Or, the single actuation member may be separate from the speed setting member and connected thereto by a releasable coupling, and such coupling may be effective only over a portion of the entire range of movement of the actuation member, such range being that where the diaphragm remains at its maximum and the monotonous uniform graduations of exposure values are obtained by changes in the shutter speed.

Figure 6:
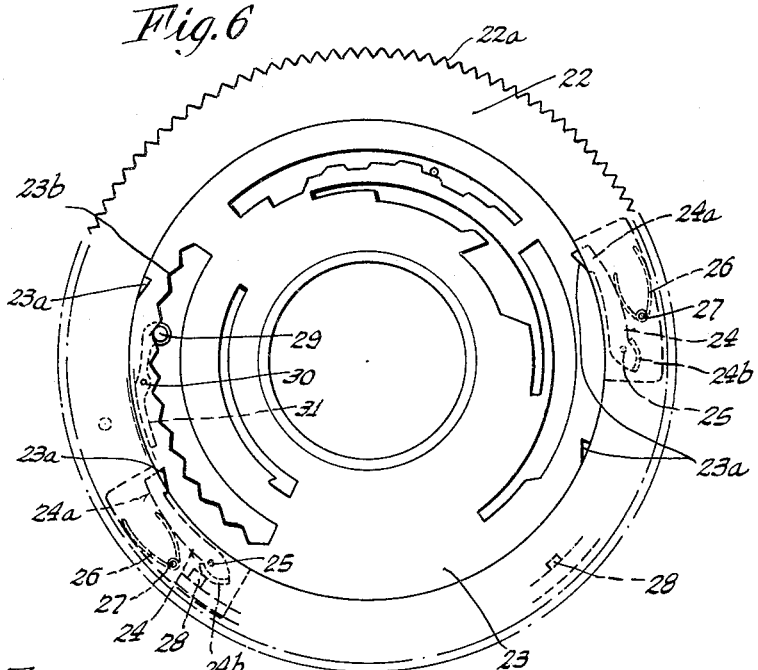
FIG. 6 is a front elevational view of a photographic lens shutter with the front cover plate removed and showing a coupling device as provided by the invention, between the single actuation member and a speed setting member.

Such releasable coupling is illustrated in FIG. 6. Here, the main or single actuation member is indicated at 22, said member having a knurling 22a to provide a good grip. A speed setting ring 23 is provided, arranged concentrically with respect to the actuation member 22, and the latter has two one-sided latches or pawls 24 which are effective in opposite directions. The latches 24 are carried on spindles 25 and are acted on by springs 26 anchored by pins 27 fixed in the member 22. The ends 24a of the pawls are receivable in notches 23a provided in the circumference of the speed setting ring 23. The distance between the notches of any pair cooperating with one pawl corresponds to the partial range of movement of the single actuation member 22 wherein the shutter speed remains constant at a value suitable for hand held picture taking while the exposure value graduation is obtained by changing the diaphragm. For such range there is no driving connection between the members 22 and 23.

In order to effect automatically the coupling of the members 22 and 23, for such range, two fixed stops 28 are provided for engagement with pointed or sharp arms 24b on the pawls 24. When one pawl strikes a stop 28 it is moved against the action of the associated spring 26 and is forced out of its notch 23a, thereby releasing the speed setting member 23 from the single actuation member 22. It will be understood from FIG. 6 that only a slight amount of turning of the member 22 is involved in such release by the pawl 24 as effected by the stops 28. Upon release of the speed-setting ring 23 such ring remains motionless, whereas the single or main actuation member 22 together with the diaphragm adjustment mechanism may be adjusted further, to effect changes in the diaphragm opening. During such further movement the pawls 24, 24a slide along the circumferential portions of the speed setting ring 23 located between the pairs of notches 23a, and upon the pawls reaching the other notches of the pairs the coupling is again established between the members 22 and 23.

In order to insure that the speed setting ring 23 remains motionless when it is uncoupled from the driving member 22 a notched detent is provided, comprising notches 23b in the speed setting ring 23, cooperating with a yieldably mounted pin 29 carried by one arm of a two armed lever 31 having a fixed pivot pin 30 rigid with respect to the shutter housing, such lever being made of flexible material. The remaining arm of the lever 31 abuts a fixed part, as for example the side wall of the shutter housing.

The notches 23a are formed to receive sharp teeth such as the pointed arms 24a of the pawls 24, thereby to prevent the speed setting ring 23 from having any intermediate positions. The advantage of having a releasable connection between the members 22 and 23 rests in the fact that the control cams of the speed setting member 23 may be of the well-known type, and need not be especially constituted. Thus, these control cams may be as shown in FIG. 6 as distinguished from the speed control cam of the speed setting ring 3 shown in FIG. 3, wherein a large dwell 3x must be provided for the speed setting of $1/60$ of a second, during which dwell all the different diaphragm openings may be obtained for the exposure values between 9 and 15. In FIG. 3, the cam has six steps to the left of the cam follower F, corresponding respectively to shutter speeds of $1/2$ second, $1/4$ second, $1/8$ second, $1/15$ second, and $1/30$ second for the exposure values running from 3 to 8; to the right of the dwell 3x the cam has three steps corresponding to speeds of $1/125$ second, $1/250$ second and $1/500$ second, and the use of these speeds will be hereinafter more fully brought out. From the above it is seen that the speed setting ring 23 may have a relatively small movement, and this is of importance in the fabrication of a speed control member or ring, with respect to its various control functions.

As previously mentioned, according to the present invention a main or single actuation member coordinates speeds and diaphragm values so that for a chosen shutter speed of say $1/60$ of a second (speed ring positioned so pin F is on edge 3x, see FIG. 2) wherein pictures may be readily taken with the camera held in the hand, the entire range of diaphragm values may be adjusted by moving the actuation member through part of a monotonous or uniform exposure value scale. For another portion of the range of movement of the single or main actuation member, corresponding to the six-stepped portion of the cam edge of the ring 3 disposed to the left of the edge portion 3x, see FIG. 3, the largest diaphragm opening will be maintained whilst the shutter speeds are varied from $1/60$ of a second to 1 second. This range of movement of the actuation member would, for example, cover the exposure values from 9 to 15 (FIG. 1). In other words, for the exposure values starting with 3 and ending with 8 the shutter speeds of 1 second, $1/2$ second, $1/4$ second, $1/8$ second, $1/15$ second, and $1/30$ second would all be obtained with a maximum diaphragm opening of 2.8, and for exposure values from 9–15 the shutter speed would remain constant at $1/60$ second and the diaphragm openings would be respectively 2.8, 3.5, 6.3, 8, 11, 16 and 22.

In the embodiment of the invention shown in FIGS. 1 and 2, for the exposure values of 16, 17 and 18 a minimum diaphragm opening of 22 is maintained when the lug 4b under the action of the spring 5 has shifted the arm 2b and ring 2 until the pin 10 is engaged at the left end of the slot 2a (in consequence of clockwise movement of ring 3 as viewed in FIG. 2, or counterclockwise movement of ring 3 as viewed in FIG. 3) whilst the shutter speeds are respectively $1/125$ second, $1/250$ second and $1/500$ second by further movement of the ring 3, bringing the pin F on the 3-stepped portion of the cam (to the right of the edge portion 3x as seen in FIG. 3). Thus, the exposure value scale is uniformly extended, by virtue of these speeds, to the value 18.

In FIGS. 4 and 5 the exposure values beyond the number 15 are continued in another way, to carry out the uniform scale. For the exposure values of 16 and 17 the shortest shutter speed of $1/500$ second is utilized, in conjunction with the minimum diaphragm openings of 11 and 16 respectively. For the exposure value of 18, a shutter speed of $1/500$ second and diaphragm of 22 is used. Since, with this organization the fastest shutter speed is obtained without using the slow speed assembly, and since speeds of $1/125$ second and $1/250$ second are not utilized the shutter speed retarding mechanism need be utilized only for shutter speeds of $1/60$ second and slower. Thus, there follows an important advantage in a simplification of structure and an economy of manufacture.

For the purpose of setting the single or main actuation member 3 in FIG. 1, the side wall of the shutter housing 1 may be provided with an exposure value scale 32, adapted to cooperate with an index mark 33 carried by the periphery of the main member. In addition to the exposure value numbers, the scale 32 may additionally comprise speed indications not automatically controlled by the shutter. Thus, a "B" marking may be provided, for cooperation with the index mark 33. In consequence, the same single or main actuation member 3 may be utilized for obtaining speeds not automatically controlled by the shutter, as well as those speeds which are automatically controlled. In the structure of FIG. 1, the diaphragm aperture which is used when the main member 3 is adjusted to the setting "B" is necessarily the same with every exposure, and in consequence it is not difficult for the operator to determine the respective speed-diaphragm relations when using "B" exposures.

For the purpose of obtaining accurate exposure data eliminating all errors, considering light conditions, film sensitivity and other exposure factors such as filter data and the like, the use of an exposure meter is advantageous. To spare the operator to the utmost extent any mental calculations for obtaining a setting value corresponding to all of the picture taking conditions including data obtained from such exposure meter which would require changes in the adjustment of the single or main actuation member, there is further provided by the invention a coupling device which may be arranged between said main member and the exposure meter. The coupling device may be carried in or on the camera structure, and will function to enable coincidence to be obtained between pointer of the exposure meter and an adjustable setting mark.

The coupling device between the main actuation member and the exposure meter may be executed in different well-known manners. For example, it may constitute a resistance coupling by arranging in the circuit of the exposure meter one or several resistances adapted to be changed in response to shifting movement of the single actuation member. Or, an optical coupling may be provided where the illuminating surface of the photographic element of the exposure meter is changeable by a diaphragm actuated by the single or main actuation member.

A third organization for effecting a coupling between the single actuation member and the exposure meter may be in the form of a mechanical transmission device, as shown for example in FIG. 7.

In this figure the housing of the camera structure is indicated at 34. Such housing has a front plate 34a carrying a photographic lens shutter structure 35 as provided by the invention, having a single or main actuation member 36. Also, the camera structure includes an exposure meter 37 having a usual photo-electric element and a measuring device energized thereby.

For the purpose of connecting the main actuation member 36 with the exposure meter, there is provided a transmission pin 38 shiftable in a direction parallel to the shutter axis. One end of the pin 38 is adapted to engage a driving cam 39 which is carried by the single actuation member 36. Details of the cam 39 and its connection are not shown since they are considered unnecessary to carrying out the invention. The other end of the transmission pin 38 engages a lug 40a of a toothed segment 40 which is pivotally mounted in the camera housing 34 on a fixed spindle 41. The lug 40a is bent to extend in a plane parallel to the spindle 41, so as to present an adequate bearing surface for the pin. The segment 40a is biased clockwise by a spring 42 carried by the spindle 41, and engages and drives a gear 43 which is carried on a supporting ring 44 mounting a film sensitivity scale 45. The scale 45 is adjustable with respect to an index mark 46 carried by a ring 48 which is shiftable with respect to the ring 44, having two finger-engageable pins 47. The ring 48 has a setting or index mark 49 adapted to cooperate with the exposure meter indicator 51 located under the usual window 50. To obtain a linear exposure setting in the case of non-logarithmic characteristic of the measuring device, a channel scale 52 may be arranged in the well-known manner between the window 50 and the inner diameter of the ring 48.

A mechanical coupling device as executed in the above manner between the single or main actuation member 36 and the exposure meter provides for a reliable semi-automatic exposure setting while requiring only slight additional space and few additional components. In its use, the coupling enables a simple setting to be effected since, after having preset the member 48 for the film sensitivity, it is only necessary to turn the single or main actuation member 36 until the mark 49 is brought into coincidence with the pointer 51.

In order to obtain such a simple setting procedure for flash exposures as well as for daylight, involving also the correct diaphragm aperture, I provide further in accordance with the invention means for taking into account different types of flash lamps, as well as different distances. This means comprises a distance scale and a scale for indicating different types of flash lamps, said scales being adjustable with respect to each other. Either one of such scales may be fixedly arranged with respect to the single or main actuation member 36, while the other scale may be arranged at a setting member connected with the main actuation member, or both scales may be arranged at the said setting member or both fixedly arranged with respect to the setting movement of the single or main actuation member. For adjusting the main actuation member to take into account the flash lamp type and distance, the scale arranged at the setting member cooperates with a scale which remains fixed during the setting movement of the actuation member. Or, a mark optionally arranged at the setting member or remaining fixed cooperates with one of the distance- and flash lamp type scales which is fixed or which is arranged at the setting member, respectively. For taking into consideration the film sensitivity I provide a carrier which is shiftable opposite to another or basic carrier, one carrier having the film sensitivity scale and the other having a setting mark for such scale. Either the flash lamp type or the distance scale is cooperable with the said carrier which is shiftable with respect to the basic carrier, all as will be later brought out in greater detail.

By this organization it is possible to automatically properly set the diaphragm for flash exposures in the same simple and easy manner that settings are made for daylight exposures. This is because with both daylight and flash exposures it is only necessary to bring into coincidence with each other two markings relatively adjustable towards each other in response to adjustment of the single or main actuation member. No special requirements are necessary to utilize the distance setting device and distance scale of the camera.

The means responsive to movement of the single or main actuation member, for taking into account flash exposures may be carried out in different ways, and may be arranged at different locations on the camera.

Considering the saving of space and the utilization of only few components it is advantageous to constitute the tracing member for the exposure meter indicator as the setting member for flash exposures which is connected with and driven by the single or main actuation member. This organization is shown in the embodiment in FIG. 7. Here, a flash lamp type scale 53 is provided on the ring 48 which has the index mark 49 cooperable with the exposure meter pointer 51. Such ring 48 also has the index mark 46 cooperable with the film sensitivity scale 45. The flash lamp type scale 53 may be provided in a well known manner as a sequence of known guide numbers (the guide number equals the diaphragm number multiplied by the distance number in meters) for a film sensitivity of 17/10 DIN. Or, the trade names of flash lamps may be used on the scale 53, either alone or in conjunction with the guide numbers, or symbols may be employed, of different shape and color, for instance to illustrate small and large flash lamps. Or, a sequence of other symbols of different colors, such as colored dots or panels, may be utilized. The flash lamp type scale 53 cooperates with a fixed distance scale 54 which may be located for example on a scale band fixed to the camera housing structure 34. To facilitate the matching of values between the flash lamp type scale 53 and the distance scale 54, a shiftable auxiliary mark 55 may be provided, inserted between the two scales. Such mark may be carried on the ring 57 which is shiftable by means of two pins 56 with respect to the basic carrier disc 44 and ring 48.

An automatic flash exposure setting device as above set forth has the advantage that correct adjustment of the camera may be effected in a very simple manner, by use of a single or main actuation member, for both daylight and flash lamp exposures. Moreover, the adjustment for film sensitivity is usable both for daylight and flash exposures.

It will be understood that the above-described organization is exemplary of the invention, and that the means by which flash exposures may be included in the setting of the single actuation member may optionally be located at the camera lenses or the camera shutter.

Such latter organization would be advantageous if the exposure meter of the camera is not readily accessible, as for example where it is completely incorporated in the camera. Under such conditions the same basic organization may be provided, particularly with respect to the arrangement of the scales for distance and flash lamp types, and their setting marks. Such new location would thus be similar to that described above where the exposure meter tracing member is constituted also as the flash exposure setting member.

As already mentioned above, the coordination of a given shutter speed suitable for taking exposures with the camera hand held, to the distance range of adjustment of the diaphragm, is of advantage not only for daylight pictures but also for flash exposures. This is true since the use of both flash lamps and electronic flash equipment can be restricted to that portion of the range of adjustment of the single or main actuation member which is employed to coordinate the entire diaphragm range to the chosen relatively fast shutter speed by which non-jumped pictures may be taken with the camera held in the hand. Accordingly, a simple and easy adjustment is provided, for flash exposures.

In order to provide the operator with clear instructions as to which partial range of movement of the single or main actuation member is suitable for flash exposures, I provide in accordance with the invention markings to identify such range, and associate the same with flash exposure fittings, such markings being perceptible to the sense of touch or to the eye.

In arranging such markings for visual perception they may be constituted as symbols fixedly disposed at the single or main actuation member. Such symbols may have different shapes and colors, and they may be visible throughout the said partial range of adjustment, through windows provided in the actuation member or in a fixed part.

Such organization is shown in the embodiment of the invention illustrated in FIGS. 10 and 11. In these figures, the single or main actuation member is indicated at 58, such member having a cylindrical mantle 58a provided with two elongate slots 58b of the same length. The slots 58b extend over an angular distance, measured along the mantle 58a, which corresponds to the adjustment necessary to effect the complete range of values of the diaphragm, and such slots provide access to flash lamp connectors 59 and 60. The connector 59 may be associated with a symbol 61 in the form of a flash lamp characterizing M-synchronization, whereas the fitting 60 may be associated with the symbol of a flash of lighting 62, characterizing X-synchronization. The flash lamp connectors 59 and 60 and their associated symbols remain visible and accessible in the slots 58b and are usable as long as the single or main actuation member 58 is kept in the partial range corresponding to the monotonous or uniform adjustment range of the diaphragm. If the single actuation member 58 is moved beyond such range, the connectors 59 and 60 and the associated symbols will be covered over by the mantle 58a, thus signifying that the camera adjustment is not now suitable for flash exposures.

When the single actuation member 58 is shifted from such partial range in a direction toward lower exposure values, an additional slot 58c in the mantle 58a makes visible a tripod sign 130 which is fixedly mounted, thus indicating that for such portion of the range of the single or main actuation member, pictures should now be taken only by use of a tripod or other fixed support. In place of the tripod sign 130 other designations may be used, as for example a special color such as the danger color "red."

Another embodiment of the invention providing an automatic cover for enclosing flash bulb connectors is shown in FIG. 12. In this figure the front wall 63 of the camera has two flash bulb connectors 64 and 65, marked with the symbols 61 and 62. To cover the connectors 64 and 65 I provide slides 68 and 69. These slides are arranged to pivot on spindles 70 and 71, and are under the action of springs 72 and 73 which normally bias the slides to their covering positions. To shift the slides 68 and 69 to uncovering positions I provide segment-shaped projections 76 and 77 on a ring 78, said projections cooperating, by means of pins 74 and 75, with the slides. The ring 78 is connected with the single or main actuation member 66 to move concurrently therewith. Further, to provide for perception by touch of the partial range of the single actuation member which is suitable for flash exposures, a releasable locking device may be provided, which automatically becomes operative in response to the diaphragm reaching its limits of adjustment. The locking device may be so arranged that it is released either by applying greater turning force to the single actuation member, or else by actuating a special release member.

There is also provided by the invention other means for restricting the use of flash lamps to that partial range of the single actuation member which is suitable for such purposes. Such other means involves control of the flash lamp circuit, so that a closed circuit is available only when the single actuation member is in the proper portion of its range. Such means may constitute an interruption switch, or may constitute locks acting on the existing flash contact switch, this latter being illustrated in another embodiment of the invention shown in FIGS. 15 and 16.

In FIG. 15 there is shown a housing 79 of a photographic lens shutter structure. At a side wall of the housing there is provided in a well-known manner a connector nipple 80 for M-synchronization and a second connector nipple 81 for X-synchronization. To effect the contact closure, the insulated parts of the nipples 80 and 81 cooperate with contact levers 82 and 83 respectively, said levers having multiple arms and being pivotally arranged about spindles 84 and 85. The levers 82 and 83 are under the action of springs 86 and 87 which bias them to contact closing positions. In the illustrated embodiment of the invention the contact levers 82 and 83 are controlled during the running down movement of the shutter, by means of pins 188 and 189 which are carried by an actuator ring 88 for the shutter blades (not drawn). Arms 82a and 83a of the contact levers rest on the pins 188 and 189, and during the running down movement of the shutter the ring 88 moves clockwise under the action of the shutter drive spring (not drawn), for the purposes of opening the shutter blades. Thus, the contact levers may have, under the action of the springs, a turning in a counterclockwise direction, and may come into contact with insulated contact pins 80a and 81a of the contact nipples 80 and 81.

In order to provide for closure of the flash circuit only for the proper range of adjustment of the single or main actuation member, the contact levers 82 and 83 have arms 82c and 83c projecting through slots in the shutter housing side wall and cooperating with the single actuation member. When such member is in a setting not suitable for flash exposures, the inner circumferential surface of a cylindrical mantle of such member prevents the contact levers from moving to circuit-closing positions. If the single or main actuation member, however, is in a position suitable for flash exposures, the arms 82c and 83c of the levers will be accommodated in notches 89a and 89b of the mantle 89. Such notches extend over an angular range of the mantle which corresponds to the range of movement of the single actuation member wherein full adjustment of the diaphragm is effected. Thus, during the opening movement of the shutter blade drive ring 88 the contact levers 82 and 83 may turn counterclockwise under the action of the springs 86 and 87, thereby to enable the contact arms 82b and 83b to engage the pins 80a and 81a for closing the flash circuit.

In the embodiment of the invention illustrated in FIG. 16 there is disclosed a different lock for controlling the flash lamp circuit. Here, an interruption switch is provided in the connection between the flash contact switch and the nipple, such interruption switch being controlled by the single or main actuation member.

In FIG. 16 there is shown a connector nipple 90 disposed at the side wall 131 of the shutter housing. The insulated portion of the nipple 90 is connected with a well-known flash contact switch (not drawn) by means of contact strips 92, 192 extending along the inner circumference of the housing side wall and insulated therefrom by insulation 91. The contact strip 92 is made of resilient material and has a bent up end portion 92a which normally rests against the contact strip 192. The bent end portion 92a carries a pin 93 of insulating material which passes through a slot 131a in the housing side wall and cooperates with the inner circumference of the cylindrical mantle 94 of the single or main actuation member, such mantle being similar to the mantle 89 previously described. If the single actuation member is in a position not suitable for flash exposures, the pin 93 rests against the circumferential portion 94a, and thus the bent end portion 92a is shifted against its spring action and separated from the contact strip 192. If, however, the single actuation member is in a position suitable for flash exposures, the pin 92 will be received in a notch 94b provided at the inner circumference of the mantle 94, and the bent end portion 92a may engage the contact strip 192 to effect an electrical connection between the flash contact switch and the nipple 90.

As already set forth above, a camera executed in accordance with the invention will automatically have the correct diaphragm opening for flash exposures, taking into account the distance from the object and the different types of flash lamps, this being accomplished without making use of diaphragm markings and without the operator knowing the size of the diaphragm opening which is coordinated to the various settings of the single or main actuation member. It is only necessary to effect a coincidence between two marks for flash lamp type and distance in accomplishing this, and basically no special considerations must be given to the distance-setting device with regard to shifting the same.

However, the simplicity of the setting operation for flash exposures may be still further enhanced, if the setting markings of the distance setting member are stepped with a factor of 2, and are made equidistant. In such case, the diaphragm can be automatically adjusted for different distances by the provision of a releasable coupling device between the single or main actuation member and the distance-setting member of the camera. Then, the distance setting member may be jointly displaced with the single actuation member, thereby to increase the diaphragm opening as the distance increases.

In the embodiment of the invention illustrated in FIGS. 13 and 14, the lens shutter structure is indicated at 95. In front of the shutter there is provided a single actuation member 96, held in place by a front plate 97.

To the rear of the front plate 97 there is disposed a distance setting ring 98. For the purpose of coupling the ring 98 to the single actuation member 96, the ring is connected with an arm 99 extending parallel to the shutter axis, and there is provided a coupling slide 101 having a plunger 100, said slide and plunger being carried by the arm 99. The plunger 100 has two claws 101a cooperating with notches 96a which are provided in the circumference of the member 96.

In order to restrict the joint shifting movement of the distance setting member and the single actuation member to the portion of the range suitable for flash exposures, a limitation or stop device is arranged, which becomes effective simultaneously with the establishment of the coupling between the actuation member and the distance setting member, and thus prevents displacement of the coupled parts beyond the said portion of the range.

A simple and effective stop device may be constituted of fixed stops which, when the coupling is effected, are disposed in the path of a portion of the coupling device.

In an embodiment of the invention shown in FIGS. 13 and 14 this is accomplished economically by cutting out a portion of the front plate 97 along a circumferential path corresponding to the range of adjustment which changes the diaphragm. If the slide 101 is in its coupled position, the portion 101b of the slide will cooperate with the two shoulders 97b and 97c of the cutout marked 97a, thereby to effectively stop the coupled members.

For the purpose of taking into consideration different types of flash lamps and different film sensitivities, in conjunction with the coupled single or main actuation member and the distance setting member, a flash lamp type scale and a distance scale may be provided, adjustable with respect to each other. Such scales, depending on the particular structure of the camera or shutter, may be arranged optionally at the distance setting member or at the single actuation member respectively, or both may be arranged at one of said members.

As shown, I provide a film sensitivity scale 102 arranged at the front of the single or main actuation member 96. The values of this scale are coordinated with the notches 96a for the coupling slide, and the scale is shiftable with respect to an index mark 101c connected with the slide. I provide further a flash lamp type scale 103 having markings indicative of different types of lamps, said scale being mounted on a ring 104 arranged in front of the distance setting ring 98 and adjustable with respect to the latter. For maintaining their relative adjusted positions, one of the two rings 98, 104 (as illustrated, the distance setting ring 98) is provided with a resilient coupling finger 160 which has an actuation handle 105. The finger 160 may be flexed to engage and disengage it in notches 104a provided at the circumference of the ring 104. In adjusting the lamp type scale 103, a setting mark 106 is used, provided on the distance setting ring 98, and the distance scale 107 on the ring 98 is referred to an index mark 108 fixed on the front plate 97. Also, the ring 104 has an arm 104b extending in a radial direction, carrying the arm 99 which mounts the coupling slide 101.

By the above mentioned arrangement there is obtainable at all times a correct setting of the diaphragm for flash exposures, taking into consideration changes in the distance of the subject from the camera.

In order to adapt the diaphragm opening as exactly as possible to the actual distance and thus obtain the best possible exposures, it is of advantage to couple the distance setting device of the camera in a well-known manner with a range finder incorporated in the camera. Then, the operator need only adjust the range finder to the subject; due to the coupling between the distance setting device and the single or main actuation member the diaphragm opening which is correct for the distance of the camera from the subject and for the flash lamp which is used, is automatically obtained.

When setting the camera it is advantageous for the operator to know the depth of field which is obtained for the diaphragm-distance value pair which is adjusted to. An indication of such depth of field may be given automatically, as provided by the present invention, with a device which is dependent on the diaphragm and distance settings.

In the embodiment of the invention illustrated in FIGS. 8 and 9 there is disclosed an automatic depth of field indicator. This device is simple in construction and economical to fabricate, and comprises a pair of scissor-shaped levers 109, 110 which cooperate with a distance scale 112 arranged on the distance setting ring 111. The levers 109, 110 may be displaced in accordance with the shifting movement of the diaphragm mechanism. The levers 109, 110 are arranged in a space-saving manner between the front plate 113 and the single or main actuation member 114, so as not to crowd the inner structure of the shutter. The positions of the levers are visible through a slot 113a provided in the front plate, said slot being coextensive with the distance scale 112. To prevent increasing the dimensions of the shutter axially, and to cover the indicating levers from the exterior, such levers are arranged in a rear space 113b of the front plate 113 and are supported by spindles 115 and 116 mounted on the wall of such space. The front plate is provided in the well-known manner with a conical external mantle providing an attractive and closed outward appearance. To provide the necessary space for the levers, the side wall of the rear cut out space 113b is also conical.

To adapt the levers 109, 110 to the shape of the cutout, said levers are preferably made of resilient material. Thus, the end portions 109a and 110a of the levers, which are the indicators of the depth of field and which have a step-shaped external edge, extend under the slot 113a of the front plate 113.

The levers 109 and 110 are controlled in response to shifting movement of the diaphragm mechanism, by means of cams 117a and 117b provided on a transmission ring 117 and engaging pins 118 and 119 of the levers. As with the levers, the transmission ring 117 is arranged between the single or main actuation member 114 and the front plate 113. The ring 117 is connected by a pin 120 extending through a slot 114a in the actuation member 114 to the diaphragm mechanism, in a way readily understood.

In order to more readily observe the edges of the levers 109 and 110 in the slot 113a and thus provide easier reading of the depth of field on the scale 112 I prefer to color the levers so as to contrast with the front plate.

A camera as thus provided in accordance with the invention may be adjusted as follows:

(1) Adjusting the film sensitivity

Referring to FIG. 7, the ring 48 of the exposure meter is shifted to bring the index mark 46 thereof opposite to the value on the scale 45 corresponding to the sensitivity of the film used. This adjusts for picture taking both in daylight and with flash exposures.

(2) Adjusting the speed-diaphragm relation to the light conditions prevailing To accomplish this it is only necessary to turn the single or main actuation member, indicated at 36 in FIG. 7, until the index mark 49 on the ring 48 is in coincidence with the indicator 51, through the medium of the channel scale 52. With the above adjustments both the speed diaphragm relation and film sensitivity are taken into consideration without consideration of diaphragm numbers or values, speed markings, and without knowing the various setting positions of the single actuation member.

The depth of field as now determined by the diaphragm and the distance is visible in the slot 113a (FIGS. 7, 9 and 12) in the front plate, as a closed band 109a contrasting with the plate by a special color, and such depth of field may be read on the distance scale 112.

(3) Setting the camera for flash exposures

After adjusting for film sensitivity, referring to FIG. 7, the index mark 55 is brought opposite to the number or symbol on the scale 53 indicating the type of flash lamp used, this being effected by turning the ring 57.

Now, the single or main actuation member 36 is turned to bring the mark 55 opposite to the proper distance value on the scale 54, this coordinating the diaphragm opening with the flash lamp type and the distance.

Or, for taking into consideration the film sensitivity and the flash lamp type, in the embodiment of the invention shown in FIGS. 13 and 14, the coupling between the rings 98 and 104 is released by pulling out the coupling member 160. Then the ring 104 or the distance setting ring 98 is turned to bring the index mark 106 opposite the proper number or symbol on the scale 103. The handle 105 is now released, thus again coupling the rings 98 and 104.

To set for film sensitivity, the coupled rings 98 and 104 are now turned until the index mark 101c is opposite to the sensitivity number of the film used, appearing on the scale 102. With the above settings, the coupling connection between the rings 98, 104 on the one hand and on the other hand the single actuation member was released, and it is effected again only after having adjusted the film sensitivity by shifting the coupling slide 101 in axial direction and engaging the coupling claws 101a thereof with the notches 96a of the single actuation member 96.

Now the proper diaphragm opening for the film sensitivity, type of flash lamp, and distance may be adjusted in such a way that the distance from the subject is estimated, as by turning the single or main actuation member 96 to bring the distance reading to the fixed mark 108, or a range finder if incorporated in the camera and coupled with the distance setting device is exactly adjusted to the subject. Thus, by means of the coupling between the distance setting member and the single or main actuation member, the proper diaphragm opening for the distance, film sensitivity, and flash lamp type is automatically had without requiring any calculation or mental figuring.

In the illustrated embodiments of the invention there is shown a camera having a lens shutter. However, the invention is not limited to this type of camera since it has utility for cameras of any type, including those with interchangeable lenses, where separated setting members for diaphragm and speed are arranged which are respectively adjustable to several setting positions, especially to more than two positions. Due to the novel structure effecting coordination between the speed setting and diaphragm setting members as provided by the invention, the basic structure of the camera with respect to the diaphragm mechanism and the speed regulations can as a whole remain unchanged, thus making the invention extremely important.

Thus, in accordance with the invention there is solved the problem of providing a camera which may be so simply operated that the lay person can make virtually no mistakes. Moreover, with the present improved camera such simplicity is not obtained at the expense of restriction in its application, as compared with well known cameras wherein diaphragm and speed setting members are separately actuated and have a great shifting range. Rather, the present improved camera maintains the same wide field of application, while at the same time eliminating the operational difficulties of prior cameras. This is because a user of the present camera is not required to know the speed-diaphragm values, since the coordination of the speed and diaphragm is automatically accomplished by actuation of a single or main actuation member effecting a novel control of diaphragm and shutter speed. The operator need only decide between taking exposures by hand and exposures by tripod, and such decision is made extremely simple, by the invention.

It is to be especially noted that there is eliminated, with the present camera, any necessity for knowledge of diaphragm settings which is notoriously a source of difficulty in taking pictures. The various embodiments of the invention render it unnecessary to use diaphragm and speed values for all kinds of picture taking, and insure that the correct diaphragm opening is always obtained. This is also true where flash exposures are to be taken, and where distances are obtainable through use of a range finder. With such device, flash exposures using the best possible diaphragm setting may be had without requiring computation or knowledge on the part of the operator. Moreover, in conjunction with the automatic diaphragm setting where a knowledge of values is not necessary, there is advantageously provided the depth of field indicator by which an operator may know the field depth without referring to diaphragm settings.

Moreover, where flash exposures are to be made it is of importance that the partial range of the single actuation member be utilized which adjusts for diaphragm values, and this is effected by the locking and safety devices described.

By virtue of the coupling between the single or main actuation member and the exposure meter it is unnecessary to set the camera in accordance with exposure values as provided by an exposure value scale. The invention is not restricted to coupling the single or main actuation member to an exposure meter, as such member may be coupled with other and known semi- or fully automatic exposure regulators which would allow movement of the actuation member until it reaches a certain position corresponding to the proper picture-taking conditions as related to the available light, film sensitivity, and other exposure factors.

The invention is not negatived by the fact that certain subcombinations are already known or proposed, as individual devices. By combining one or several of these devices with the single or main actuation member for speed and diaphragm, a novel and advantageous combination is effected, resulting in a much simpler and more reliable setting of the camera. Additionally, some of said sub-combinations have been illustrated wherein novel and advantageous structures not heretofore provided are disclosed.

It is thus seen that with the present invention there has been achieved for the first time a camera wherein the operation is made foolproof for every possible type of picture taking. This is insured because the values available for speed and diaphragm are correlated automatically in a useful manner and are calculated by means of the single or main actuation member, to the end that no knowledge of any kind is required as to the settings or functions of the diaphragm. In all of the illustrated embodiments of the invention, showing various combinations of devices in conjunction with the single or main actuation member there is in common the great advantage that any knowledge of the diaphragm as a setting and index factor is superfluous.

Variations and modification may be made within the scope of the claims, and portions of the improvements may be used without the other.

I claim:

1. In a photographic camera structure provided with a multispeed shutter mechanism and with an adjustable diaphragm having a movable setting member for actuating the same, in combination, a main settable actuation member movably mounted on said structure; means responsive to movement of the main setting member to a position in a partial range thereof, setting the shutter mechanism at a single given speed which is especially suitable for picture-taking with the camera hand held; releasable, automatically connected coupling means connected and operable when the main setting member is in said partial range and the shutter mechanism is set at the given single speed which is especially suitable for picture-taking with the camera hand held, said means automatically coupling said diaphragm setting member to said main member for simultaneous movement therewith over said partial range of the latter covering a plurality of consecutive settings thereof, thereby to automatically effect different consecutive diaphragm openings all with said given shutter speed, said means responsive to movement of said main member further effecting, over a different partial range covering a plurality of consecutive settings of the main member wherein the coupling between the diaphragm setting member and main member is released, different shutter speeds slower than the said above given speed, said diaphragm setting member when the coupling is so released and during the said movement of the main member over the different partial range remaining substantially at rest, thereby to hold the diaphragm opening constant.

2. The invention as defined in claim 1, in which there is a biasing means for moving the diaphragm to a given end position, and in which the said releasable coupling means comprises a transmission device actuated by the main member and adapted for engagement with the diaphragm setting member.

3. The invention as defined in claim 2, in which the transmission device comprises a turnable ring, in which there is a spring acting on said ring to turn it in one direction, the said biasing means which acts on the diaphragm being adapted to oppose the action of said spring but yielding thereto, in which there is an abutting, separable driving connection between said turnable ring and the main member, said connection remaining engaged as the main member drives the turnable ring against the action of said spring.

4. The invention as defined in claim 2, in which the diaphragm comprises an iris structure having a plurality of diaphragm blades.

5. The invention as defined in claim 4, in which the transmission device comprises a cam connected to the main member and a two-armed lever one arm of which constitutes a cam follower engageable with said cam and the other arm of which is adapted to drive the diaphragm.

6. The invention as defined in claim 1, in which the main member is constituted as the speed-setting member of the shutter mechanism.

7. The invention as defined in claim 1, in which there is a speed-setting member for changing the speed of the shutter mechanism, and in which there is a releasable coupling between the speed-setting member and the main member, operable to effect a drive therebetween only during movement of the main member over the said different partial range.

8. The invention as defined in claim 7, in which the releasable coupling between the speed-setting and main members comprises a pair of latches and latch springs therefor carried by one of said members and adapted to lock in opposite directions of movement of said member, the other member having notches engageable by said latches, in which there are means including fixed stops on the camera structure, for releasably shifting the latches against the action of the latch springs, thereby to release the same, in response to movement of said one member to given positions.

9. The invention as defined in claim 1, in which there are means associated with the main member, for distinguishing the said first-mentioned partial range from the second-mentioned partial range.

10. The invention as defined in claim 9, in which the means for distinguishing the first-mentioned partial range comprises symbols fixedly disposed on the camera structure adjacent the main member, and in which said main member has a shield provided with windows, adapted to cover and uncover the said symbols.

11. The invention as defined in claim 9, in which the means for distinguishing the first-mentioned partial range of the main member comprises a releasable lock associated with said member and arranged to limit the movement thereof to such range except when the lock is released.

12. The invention as defined in claim 1, in which there are means for visually indicating the said second-mentioned portion of the range of the main member.

13. In a photographic camera structure provided with a multispeed shutter mechanism and with an adjustable diaphragm having a movable setting member for actuating the same, in combination, a main settable actuation member movably mounted on said structure; means responsive to movement of the main setting member to a position in a partial range thereof, setting the shutter mechanism at a single given speed which is especially suitable for picture-taking with the camera hand held; releasable, automatically connected coupling means connected and operable when the main setting member is in said partial range and the shutter mechanism is set at the given single speed which is especially suitable for picture-taking with the camera hand held, said means automatically coupling said diaphragm setting member to said main member for simultaneous movement therewith over said partial range of the latter covering a plurality of consecutive settings thereof, thereby to automatically effect different consecutive diaphragm openings all with said given shutter speed, said means responsive to movement of said main member further effecting over a different partial range covering a plurality of consecutive settings of the main member wherein the coupling between the diaphragm setting member and main member is released, different shutter speeds slower than the said above given speed, said diaphragm setting member when the coupling is so released and during the said movement of the main member over the different partial range remaining substantially at rest, thereby to hold the diaphragm opening constant; and means responsive to movement of said main member over a still different partial range covering a plurality of consecutive settings of the main member and operable when the coupling between the diaphragm setting member and main member is not effective for effecting different shutter speeds faster than said above given speed with the diaphragm opening held at a different constant value.

14. The invention as defined in claim 13, in which there are means associated with the main member for distinguishing the said first-mentioned partial range from the second and third-mentioned partial ranges.

References Cited in the file of this patent

UNITED STATES PATENTS

| | | | |
|---|---|---|---|
| 2,302,597 | Bing | Nov. 17, | 1942 |
| 2,315,977 | Mihalyi | Apr. 6, | 1943 |
| 2,342,819 | Priesmann | Feb. 29, | 1944 |
| 2,590,161 | Dorsey | Mar. 25, | 1952 |
| 2,596,328 | Dorsey | May 13, | 1952 |
| 2,596,671 | Fuerst | May 13, | 1952 |
| 2,612,091 | Weiss | Sept. 30, | 1952 |
| 2,650,526 | Gebele | Sept. 1, | 1953 |
| 2,716,930 | Marson | Sept. 6, | 1955 |
| 2,887,937 | Gebele | May 26, | 1959 |